(12) United States Patent
Hoke et al.

(10) Patent No.: US 7,531,029 B2
(45) Date of Patent: May 12, 2009

(54) COATED SCREEN ADSORPTION UNIT FOR CONTROLLING EVAPORATIVE HYDROCARBON EMISSIONS

(75) Inventors: Jeffrey Barmont Hoke, North Brunswick, NJ (US); Mark Thomas Buelow, Phillipsburg, NJ (US); John Joseph Kauffman, Hazlet, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 420 days.

(21) Appl. No.: 11/440,266

(22) Filed: May 23, 2006

(65) Prior Publication Data

US 2006/0272508 A1 Dec. 7, 2006

Related U.S. Application Data

(60) Provisional application No. 60/686,486, filed on Jun. 1, 2005.

(51) Int. Cl.
*B01D 53/04* (2006.01)
*F02M 33/02* (2006.01)
(52) U.S. Cl. .......................... 96/134; 96/154
(58) Field of Classification Search .................. 95/146; 123/518–521; 96/134, 154
See application file for complete search history.

(56) References Cited

U.S. PATENT DOCUMENTS

| | | |
|---|---|---|
| 4,027,367 A | 6/1977 | Rondeau |
| 4,261,716 A | 4/1981 | Schwartz et al. |
| 4,276,058 A | 6/1981 | Dinsmore |
| 4,276,864 A | 7/1981 | Waschkuttis |
| 4,308,841 A | 1/1982 | Kingsley |
| 4,331,456 A | 5/1982 | Schwartz et al. |
| 4,338,101 A | 7/1982 | Tuttle |
| 4,750,465 A | 6/1988 | Rediker, Jr. et al. |
| 4,870,046 A | 9/1989 | Yamanaka et al. |

(Continued)

FOREIGN PATENT DOCUMENTS

CN 1059701 A 3/1992

(Continued)

OTHER PUBLICATIONS (SAE) Society of Automotive Engineers Publication No. 920847, Heimrich et al., Feb. 24-28, 1992.

(Continued)

*Primary Examiner*—Frank M Lawrence
(74) *Attorney, Agent, or Firm*—Bronwen M. Loeb; Drinker Biddle & Reath; Melanie L. Brown

(57) ABSTRACT

A hydrocarbon adsorption unit for recovery of volatile hydrocarbons which emanate from several sources and which would otherwise be released into the atmosphere through the air cleaner of an automobile engine when the engine is shut off. The unit is positioned in the air intake system such that all air flowing through the engine passes through the unit. The unit comprises a housing having an air inlet and an air outlet. The housing contains a substrate and a volatile hydrocarbon adsorber material coated on the surface of the substrate. The adsorber material may be silica gel, a molecular sieve and/or activated carbon. The material further contains a binder that will cause the material to adhere to the surface of the substrate.

19 Claims, 2 Drawing Sheets

U.S. PATENT DOCUMENTS

| | | | |
|---|---|---|---|
| 4,877,001 | A | 10/1989 | Kenealy et al. |
| 4,985,210 | A | 1/1991 | Minami |
| 5,051,244 | A | 9/1991 | Dunne et al. |
| 5,094,218 | A | 3/1992 | Everingham et al. |
| 5,125,231 | A | 6/1992 | Patil et al. |
| 5,158,753 | A | 10/1992 | Take et al. |
| 5,241,940 | A | 9/1993 | Gates, Jr. |
| 5,603,215 | A | 2/1997 | Sung et al. |
| 5,636,619 | A | 6/1997 | Poola et al. |
| 5,647,333 | A | 7/1997 | Mukai |
| 5,912,368 | A | 6/1999 | Satarino et al. |
| 6,000,217 | A | 12/1999 | Hochmuth |
| 6,089,014 | A | 7/2000 | Day et al. |
| 6,171,556 | B1 | 1/2001 | Burk et al. |
| 6,391,075 | B1 | 5/2002 | Meiji et al. |
| 6,416,562 | B1 | 7/2002 | Shibuya et al. |
| 6,432,179 | B1 | 8/2002 | Lobovsky et al. |
| 6,438,486 | B1 | 8/2002 | Mancini |
| 6,464,761 | B1 | 10/2002 | Bugli |
| 6,474,312 | B1 | 11/2002 | Zulauf et al. |
| 6,540,815 | B1 | 4/2003 | Hiltzik et al. |
| 6,543,427 | B2 | 4/2003 | Kawasaki |
| 6,592,655 | B2 | 7/2003 | Iriyama et al. |
| 6,736,871 | B1 | 5/2004 | Green et al. |
| 6,758,885 | B2 | 7/2004 | Leffel et al. |
| 6,792,749 | B2 | 9/2004 | Ueno et al. |
| 6,817,345 | B2 | 11/2004 | Lawrence |
| 6,835,234 | B2 | 12/2004 | Leffel et al. |
| 6,863,984 | B2 | 3/2005 | Hoke et al. |
| 6,997,977 | B2 * | 2/2006 | Dallas et al. .................. 96/153 |
| 7,407,534 | B2 * | 8/2008 | Choi ........................... 96/154 |
| 2001/0047790 | A1 | 12/2001 | Karlsson |
| 2002/0029693 | A1 | 3/2002 | Sakakibara et al. |
| 2002/0043156 | A1 | 4/2002 | Shea |
| 2002/0150805 | A1 | 10/2002 | Stenersen et al. |
| 2002/0150806 | A1 | 10/2002 | Stenersen et al. |
| 2002/0157359 | A1 | 10/2002 | Stenersen et al. |
| 2003/0024506 | A1 | 2/2003 | Oda et al. |
| 2003/0037675 | A1 | 2/2003 | Gillingham et al. |
| 2003/0082824 | A1 | 5/2003 | Dumas et al. |
| 2003/0106293 | A1 | 6/2003 | Tanaka et al. |
| 2003/0145732 | A1 | 8/2003 | Leffel et al. |
| 2003/0192512 | A1 | 10/2003 | Luley et al. |
| 2004/0050252 | A1 | 3/2004 | Wernholm et al. |
| 2004/0069146 | A1 | 4/2004 | Carter et al. |
| 2004/0118387 | A1 | 6/2004 | Lawrence |
| 2004/0134353 | A1 | 7/2004 | Gillingham et al. |
| 2004/0149129 | A1 | 8/2004 | Petersson et al. |
| 2004/0182240 | A1 | 9/2004 | Bause et al. |
| 2004/0211320 | A1 | 10/2004 | Cain |
| 2004/0226440 | A1 | 11/2004 | Foong et al. |
| 2004/0250680 | A1 | 12/2004 | Wright |
| 2004/0255783 | A1 | 12/2004 | Graham et al. |
| 2004/0255911 | A1 | 12/2004 | Abdolhosseini et al. |
| 2005/0081717 | A1 | 4/2005 | Meiller et al. |

FOREIGN PATENT DOCUMENTS

| | | |
|---|---|---|
| DE | 199 15 447 A1 | 10/2000 |
| DE | 101 02 604 A1 | 7/2002 |
| DE | 101 34 250 A1 | 1/2003 |
| EP | 1 110 593 A1 | 10/2000 |
| EP | 1 273 789 A1 | 6/2001 |
| EP | 1 321 659 A2 | 6/2003 |
| EP | 1 331 118 A1 | 7/2003 |
| GB | 2 198 053 A | 6/1998 |
| WO | WO 96/22146 | 7/1996 |
| WO | WO 97/11769 | 4/1997 |
| WO | WO 02/057615 A1 | 7/2002 |
| WO | WO 2004/033889 A1 | 4/2004 |

OTHER PUBLICATIONS

U.S. Appl. No. 11/282,814, Hoke et al., "Hydrocarbon Adsorption Method and Device for Controlling Evaporative Emissions from the Fuel Storage System of Motor Vehicles", filed Nov. 18, 2005.

U.S. Appl. No. 11/281,629, Hoke et al., "Improved Zeolite Slurry Washcoat Formulation for Use at Low Temperature", filed Nov. 17, 2005.

U.S. Appl. No. 11/281,662, Hoke et al., "Hydrocarbon Adsorption Trap for Controlling Evaporative Emissions from EGR Valve", filed Nov. 17, 2005.

U.S. Appl. No. 11/281,349, Buelow et al., "Hydrocarbon Adsorption Filter For Air Intake System Evaporative Emission Control", filed Nov. 17, 2005.

English language Abstract for CN 1059701A, Kuixi et al., "High Silicon Beta Zeolite", Pub. Date: Mar. 25, 1992, from Delphion.

Visteon Corporation: Innovations: Air Induction System with Emissions Control, May 1, 2003; Internet: Http://www.visteon.com/about/features/2003/050103.shtml.

English Language Translation for EP 1 321 659 A2, Rhode et al., "Air Intake Device For An Internal Combustion Engine", Jul. 25, 2003.

* cited by examiner

COATED SCREEN ADSORPTION UNIT FOR CONTROLLING EVAPORATIVE HYDROCARBON EMISSIONS

CROSS REFERENCE TO RELATED APPLICATION

This application claims priority of U.S. Provisional Application No. 60/686,486, filed Jun. 1, 2005, entitled "COATED SCREEN ADSORPTION UNIT FOR CONTROLLING EVAPORATIVE HYDROCARBON EMISSIONS".

FIELD OF THE INVENTION

This invention relates to a unit for adsorbing volatile hydrocarbon fuel vapors in the air induction system of an automobile. These vapors are generated after engine shut-off and, if not adsorbed, will flow out of the air cleaner into the atmosphere.

BACKGROUND OF THE INVENTION

Systems and methods for trapping volatile hydrocarbon fuel vapors, from the fuel tank of an automobile are well known. Such systems are typically referred to as evaporative loss control systems and rely on a canister containing a regenerable adsorbent such as activated charcoal. The adsorbent adsorbs the volatile hydrocarbons and when engine operating conditions are appropriate for combusting the trapped hydrocarbons, a stream of air is passed through the adsorbent to desorb the adsorbent and the hydrocarbon-laden air stream is passed into the engine where the desorbed hydrocarbons are combusted. Exemplary U.S. patents disclosing evaporative loss control systems include the following: U.S. Pat. Nos. 4,877,001; 4,750,465; and 4,308,841.

Systems and methods for adsorbing uncombusted hydrocarbons in the exhaust gas stream of an automobile are also well known. These systems and methods are particularly useful for adsorbing uncombusted hydrocarbons emitted during the cold start of the automobile engine.

For example, U.S. Pat. No. 4,985,210 is directed to an exhaust gas purifying apparatus for an automobile employing a three-way catalyst with either a Y-type zeolite or a mordenite used in a hydrocarbon trap upstream of the three-way catalyst. In the embodiment of FIG. 2 of U.S. Pat. No. 4,985,210, a bed of activated carbon is disposed upstream of an adsorbent zone. A solenoid-operated valve mechanism serves to direct the exhaust gas stream either through or around the activated carbon bed, depending on the temperature of the exhaust gas stream, and then through the adsorbent zone and the three-way catalyst.

U.S. Pat. No. 5,051,244 is directed to a process for treating an engine exhaust gas stream in which the gas stream is directed through a molecular sieve in an adsorbent zone during the cold-start phase of engine operation. When the hydrocarbons begin to desorb, the adsorbent zone is by-passed until the catalyst is at its operating temperature, at which point the gas stream is again flowed through the adsorbent zone to desorb hydrocarbons and carry them to the catalyst zone. A paper by M. Heimrich, L. Smith and J. Kotowski entitled Cold-Start Hydrocarbon Collection for Advanced Exhaust Emission Control, SAE Publication Number 920847, discloses an apparatus which functions in a manner similar to that of U.S. Pat. No. 5,051,244.

U.S. Pat. No. 5,125,231 discloses an engine exhaust system for reducing hydrocarbon emissions, including the use of beta zeolites as hydrocarbon adsorbents. Zeolites having a silica/alumina ratio in the range of 70/1 to 200/1 are preferred adsorbents. The apparatus includes by-pass lines and valves to direct exhaust gases from a first converter directly to a second converter during cold-start operation and when the first converter reaches its light-off temperature, to either by-pass the second converter or recycle effluent from it to the first converter.

U.S. Pat. No. 5,158,753 discloses an exhaust gas purifying device comprising: a catalyst device installed in the exhaust gas path of an internal combustion engine for treating the exhaust gas of the engine; an adsorbing device installed in the exhaust gas path between the catalyst device and the internal combustion engine, for treating the exhaust gas of the engine. One embodiment includes a heat exchanger for performing heat transfer between the exhaust gas flowing from the internal combustion engine to the adsorbing device and the exhaust gas flowing from the adsorbing device to the catalyst device. Alternatively, the catalyst device includes a catalyst secured in the low-temperature-side gas flow path of a heat exchanger, and the exhaust gas flowing from the internal combustion engine to the adsorbing device is allowed to flow to the high-temperature-side gas flow path of the heat exchanger.

U.S. Pat. No. 6,171,556 discloses a method and apparatus for treating an exhaust gas stream containing hydrocarbons and other pollutants. The method comprises the steps of flowing the exhaust gas stream through a catalytic member comprising a monolith body having a first catalyst zone and a second catalyst zone therein to contact a catalyst in a first catalyst zone to convert at least some of the pollutants in the exhaust gas stream into innocuous products. The exhaust gas stream is then discharged from the catalytic member and flowed through an adsorbent zone to adsorb at least some of the hydrocarbon pollutants with an adsorbent composition. The exhaust gas stream is discharged from the adsorbent zone and flowed to the second catalyst zone to convert at least some of the pollutants into innocuous products. The exhaust gas stream, so treated, is then discharged to the atmosphere through suitable discharge means. A preferred adsorbent is a zeolite, having a relatively high silica to alumina ratio and a low relative Bronsted acidity. The preferred adsorbent compositions comprise beta zeolites.

Systems for adsorbing vapors which would other wise be emitted into the atmosphere from the vehicle's air induction system when the vehicle is shut-off are also well known. U.S. patent application Publication Ser. No. US2002/0043156 A1 discloses a housing securing an air filter having an air stream inlet and an air stream outlet. The air filter comprises a filter media disposed on a support that is disposed within, or secured to, the housing and an air permeable hydrocarbon adsorbing material is disposed between the filter media and the support at the air stream outlet end of the filter. The preferred hydrocarbon adsorbent is an activated carbon cloth.

EP 1 110 593 A1 is similar to the U.S. patent application Publication. The EP Patent Application discloses an air filter assembly including a housing and a plurality of filter layers disposed in the housing. One of the filter layers is a carbon impregnated polyurethane foam layer to remove hydrocarbon vapors diffusing through an air inlet to the filter when the engine is shut-off.

It has been found that a significant amount of volatile hydrocarbons from several sources collect in the air induction system of the automobile engine after the engine has been shut off. These hydrocarbons are then discharged into the atmosphere after the engine has been shut off. Prior art systems and methods devote relatively little attention to prevention of the emissions of such hydrocarbons through the air induction system of the engine since the amounts of such emissions are relatively small as compared to the emissions of hydrocarbons from the fuel system and the exhaust gas stream which would pass into the atmosphere if left untreated. Nevertheless, in view of the increasingly stringent federal and state regulations mandating the elimination of all emissions of uncombusted hydrocarbons in the atmosphere to the extent technically feasible, it is desirable to provide equipment to adsorb such hydrocarbons.

Accordingly, it is the object of this invention to provide a unit for adsorbing volatile hydrocarbons emitted after the engine has been shut-off, in the air induction system upstream of the engine and thereby prevent the emission of such hydrocarbons into the atmosphere.

SUMMARY OF THE INVENTION

The invention comprises a novel unit for adsorbing hydrocarbons emitted into the air induction system of a vehicular engine during engine shut-off. In one aspect the present invention is directed to the use of a hydrocarbon adsorbent coated foraminous substrate for controlling evaporative hydrocarbon emissions from vehicles. In particular, this invention relates to the use of a novel adsorbent coated foraminous substrate for controlling evaporative hydrocarbon emissions from the air intake system of motor vehicles when the engine is not operating.

In another aspect, the present invention is directed to a hydrocarbon adsorbent coated substrate and at least one protective screen adjacent to the hydrocarbon adsorbent coated substrate for controlling evaporative hydrocarbon emissions from the air intake system of motor vehicles when the engine is not operating.

Other objectives and advantages of the present invention will become apparent from the following description and appended claims.

DETAILED DESCRIPTION OF THE INVENTION

Figure 1:
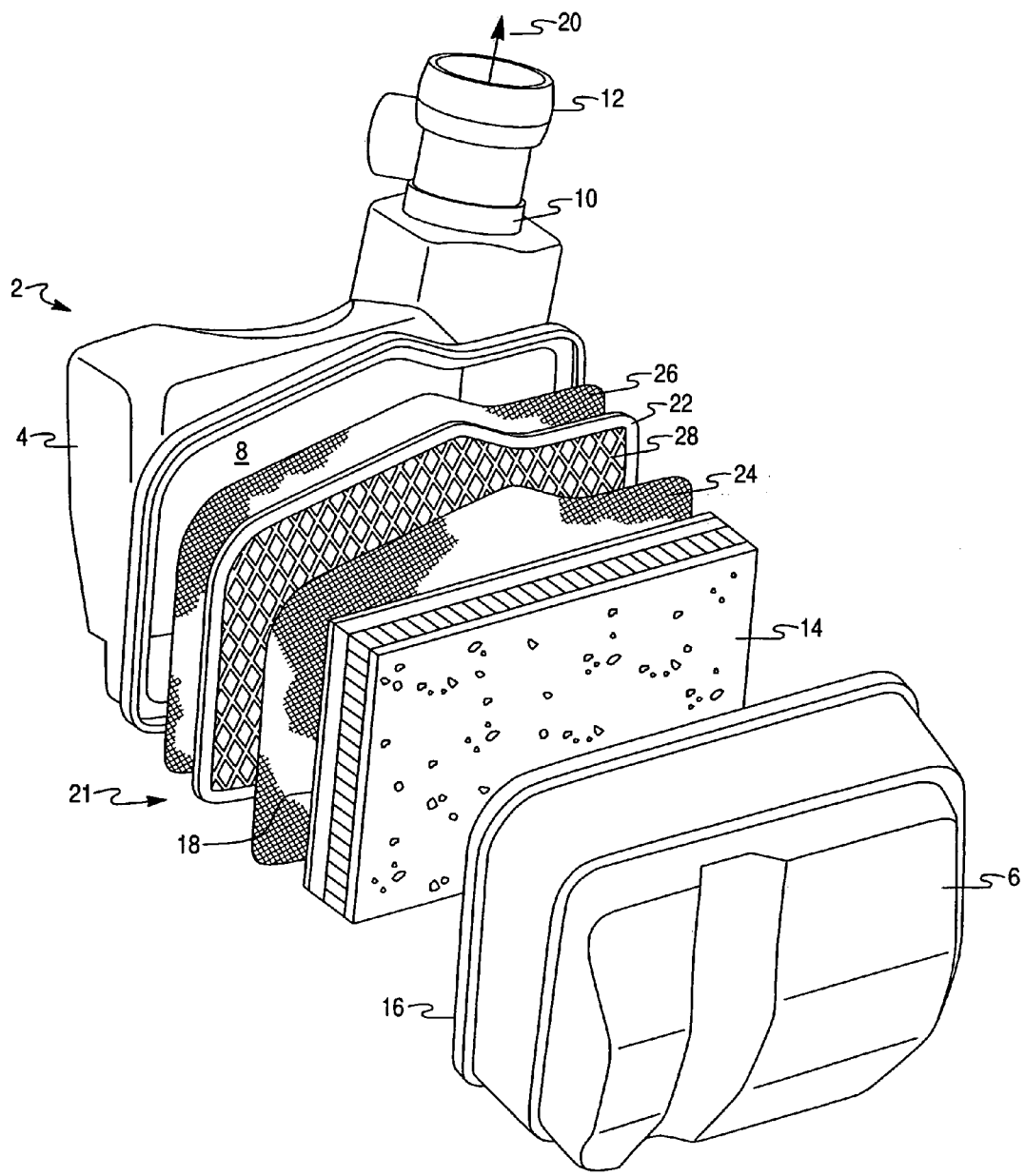
FIG. 1 is an exploded view of the air cleaner in accordance with the present invention.

The volatile hydrocarbon adsorber unit of this invention is particularly suited for adsorbing volatile hydrocarbon fuel vapors that would otherwise be emitted into the atmosphere through the air induction system of an automobile engine after the engine has been shut off. Such fuel vapors emanate from several sources, e.g., residual fuel, puddle, post-run injector leakage, blowby, hydrocarbons from exhaust gas recycle, oil hydrocarbons from the PCV, etc. It is the goal of this invention to adsorb such fuel vapors helping to meet the LEV II and PZEV limits which will be imposed by the California Air Resource Board and the Tier II limits which will be imposed by the Federal government in respect to the 2004 model year automobiles.

In one embodiment, the volatile hydrocarbon adsorber unit of the present invention is positioned in the air intake system such that all air flowing through the engine passes through the unit. In another embodiment, the volatile hydrocarbon adsorber unit may be located out of the direct air flow path through the air intake system, e.g., the volatile hydrocarbon adsorber unit can be positioned against one or more walls of the air intake system. The air intake system comprises a housing having an air inlet and an air outlet. Within the housing are contained one or more volatile hydrocarbon adsorber units, which comprise a substrate and a volatile hydrocarbon adsorbent material coated on the surface of the substrate. The substrate may contain a binder that will cause the hydrocarbon adsorbent material to adhere to the surface of the substrate.

The volatile hydrocarbon adsorber unit of this invention comprises a frame containing a foraminous substrate and a volatile hydrocarbon adsorber material coated on the surface of the substrate. The foraminous substrate can be metallic or polymeric and can be made from any material known in the art. Preferred metals include stainless steel alloys, e.g., 304 and 316 stainless steels, Fe—Cr—Al alloy, titanium, or aluminum. Preferred polymeric substrates include nylon, polypropylene, PVC, ABS, or polyethylene. The foraminous substrate must be able to withstand the automotive underhood environment. Accordingly, metal substrates are preferred and nylon is preferred over other polymeric substrates.

In one embodiment, the foraminous substrate is a relatively large opening screen coated with a volatile hydrocarbon adsorbent material. The screen can be woven or non-woven with woven preferred. The woven screen provides a uniform opening which results in uniform airflow without channeling. The screen can be welded at the wire junction or non-welded. The choice of screen geometry has to be considered. Typically, the screen is a wire mesh, which has a tight weave with small openings in order to increase the likelihood that hydrocarbon molecules will contact the coated wires as the hydrocarbons diffuse through the screen. However, it is also desirable to have large enough openings to reduce air flow restriction to a minimum during operation of the engine. Thus, for example, the wire diameter can be from about 0.01 to about 0.07 inches, preferably about 0.02 inches to about 0.035 inches, more preferably about 0.023 to 0.028 inches, with a mesh size from about 4 by 4 to about 100 by 100 wires per linear inch, preferably from about 8 by 8 to about 20 by 20 wires per linear inch, more preferably about 12 by 12 wires per linear inch.

In an exemplary embodiment, the hydrocarbon adsorption unit further comprises at least one protective screen or cloth adjacent to the hydrocarbon adsorbent coated substrate. The protective screen can be located on the upstream or downstream side of the hydrocarbon adsorbent coated substrate. In another embodiment, the hydrocarbon adsorption unit comprises a first protective screen on the upstream side of said hydrocarbon adsorbent coated substrate and a second protective screen on the downstream side of said hydrocarbon adsorbent coated substrate. The protective screen or cloth can be woven or non-woven metal, or plastics such as nylon, polypropylene, polyester, PVC, ABS, or polyethylene. In a preferred embodiment, a woven nylon screen can be used. One function of this screen is to prevent adsorbent coating from being lost into the engine should it come off the screen. In the environment of an automobile engine spalling of the adsorbent coating can be a problem. For example, the adsorber material may chip, peal, crack or otherwise come off from the foraminous substrate due to heat and vibration from the engine, enter the engine, and clog small engine passages, such as fuel injections lines. Thus, the protective screen must have openings small enough to catch adsorbent coating particles, but at the same time must be open enough so that air flow during engine operation is not overly restricted. The protective screen can have openings from about 50 to about 1000 microns, preferably about 200 to about 500 microns, and a wire diameter of about 30 to about 1000 microns, preferably from about 80 to about 200 microns.

In another exemplary embodiment, the coated foraminous substrate and the at least one protective screen or cloth are held together with a frame. A particularly useful frame is a nylon frame that is about 1/16" thick with approximately 1/2 width.

The frame assemble can be held together by any known means in the art, e.g., the frame assembly can be held together by mechanical means, welding, chemical adhesive, or thermal bonding of the polymer frame.

The volatile hydrocarbon adsorber unit of the present invention may be more readily appreciated by reference to the Figures, which are merely exemplary in nature and in no way intended to limit the invention or its application or uses. Referring in particular to FIG. 1, an air cleaner 2 is formed from a two-piece housing 4, 6 defining an elongated flat like air cleaner 2. The housing defines a closed hollow interior or shell 8, wherein the first portion 4 has a clean air port 10 for connecting the clean air duct 12. The second portion 6 has an inlet port (not shown) located on the side of the second portion 6 for connecting the dirty air duct. The two-piece housing is assembled to define a one piece air-cleaner 2 installed underneath the hood of a motor vehicle.

Preferably, the two-piece housing 4, 6 is made of plastic and the two pieces are snap fitted together to provide a one piece air cleaner 2. Alternatively, the housing may be made of metal or plastic metal composites. Although in the drawings, an air cleaner 2 having a rectangular shape is shown and described, it must be understood that the air cleaner 2 may have different shapes, such as round or oval.

The air cleaner 2 comprises an air filter material 14. The air filter material 14 in disposed in the hollow interior 8 of the two-piece housing 4, 6. The air filter material 14, functions to absorb the dirt present in the ambient air and divides the housing into a dirty air portion 16, located upstream from the air filter material 14 and a clean air portion 18 located downstream from the air filter material 14. Typically, the air filter material 14 is made of paper formed of compressed fabric. In order to allow air to pass through the air filter material 14 is provided with microscopic holes. As the air is drawn from the environment, the air filter material 14 collects the dirt and dust particles. Alternatively, the air filter material 14 may have added or be formed of oil-based material such that dirt and dust will stick to the air filter material 14. The clean air exiting the air filter material 14, shown by arrow 20 is substantially free of dirt and dust particles.

When the engine is switched on, the air is drawn from the environment, is filtered by the air filter material 14 and the clean air 20 is transported to the engine. However, when the engine is switched off, unburnt hydrocarbons may be released to the environment. Therefore, to prevent hydrocarbons from escaping to the environment, the air cleaner 2 is provided with a hydrocarbon adsorbing unit 21.

As shown in FIG. 1, the hydrocarbon adsorbing unit 21 is positioned downstream from the air filter material 14 in the clean air portion 18 of the housing 4, 6. In another embodiment, the hydrocarbon adsorbing unit 21 may be positioned upstream from the air filter material 14 in the dirty air portion 16 of the housing 4, 6 (not shown). As clearly shown in FIG. 1, the hydrocarbon adsorbing unit 21 has the same shape as the first portion 4 of the housing. Preferably, the hydrocarbon adsorbing unit 21 comprises a hydrocarbon adsorbent coated substrate 22, which is sandwiched between upstream and downstream protective screens, 24 and 26, respectively. In an alternative embodiment, upstream screen 24 is not present, however, it is important to use downstream screen 26 to prevent any adsorbent coating particles from entering the engine. The hydrocarbon adsorbing unit 21 can be attached to first portion 4 by any known means in the art, for example by insert molding or permanent snaps such that the unit 21 can not be easily detached from the housing. Therefore, when the engine (not shown) is operating, the clean air 20 exiting the air filter material 14 would pass through the upstream protective screen 24, the hydrocarbon adsorbent coated substrate 22, and the downstream protective screen 26 to the clean air duct 12.

In the preferred embodiment, the hydrocarbon adsorbent coated substrate 22 is self-regenerating. Rather than absorbing hydrocarbons and trapping them in until the hydrocarbon adsorbent coated substrate 22 is saturated, the hydrocarbons may be relatively easily released from the hydrocarbon adsorbent coated substrate 22. The release occurs when the engine is operating and pulling air into the clear air duct 12 at a moderate to high rate. Preferably, when air passes through the air cleaner 2, the hydrocarbons trapped in the hydrocarbon adsorbent coated substrate 22 are pulled out and travel down the clean air duct 12 to the engine, where they are burned off. By allowing the hydrocarbons to be released from the hydrocarbon adsorbing unit 21, the preferred embodiment of the invention is self-regenerating, and the hydrocarbon adsorbing unit 21 does not have to be replaced over the lifetime of the vehicle as a result of hydrocarbon build-up.

The air cleaner 2 having the hydrocarbon adsorbing unit 21 can be manufactured by providing a two piece housing 4, 6. The hydrocarbon adsorbing unit 21 is obtained by coating with a hydrocarbon adsorbing material 28. The air cleaner 2 is then assembled by inserting an air filter material 14 inside the housing and attaching the hydrocarbon adsorbent coated substrate 22, which contains upstream 24 and downstream 26 protective screens, to the first portion 4 of the housing.

Figure 2:
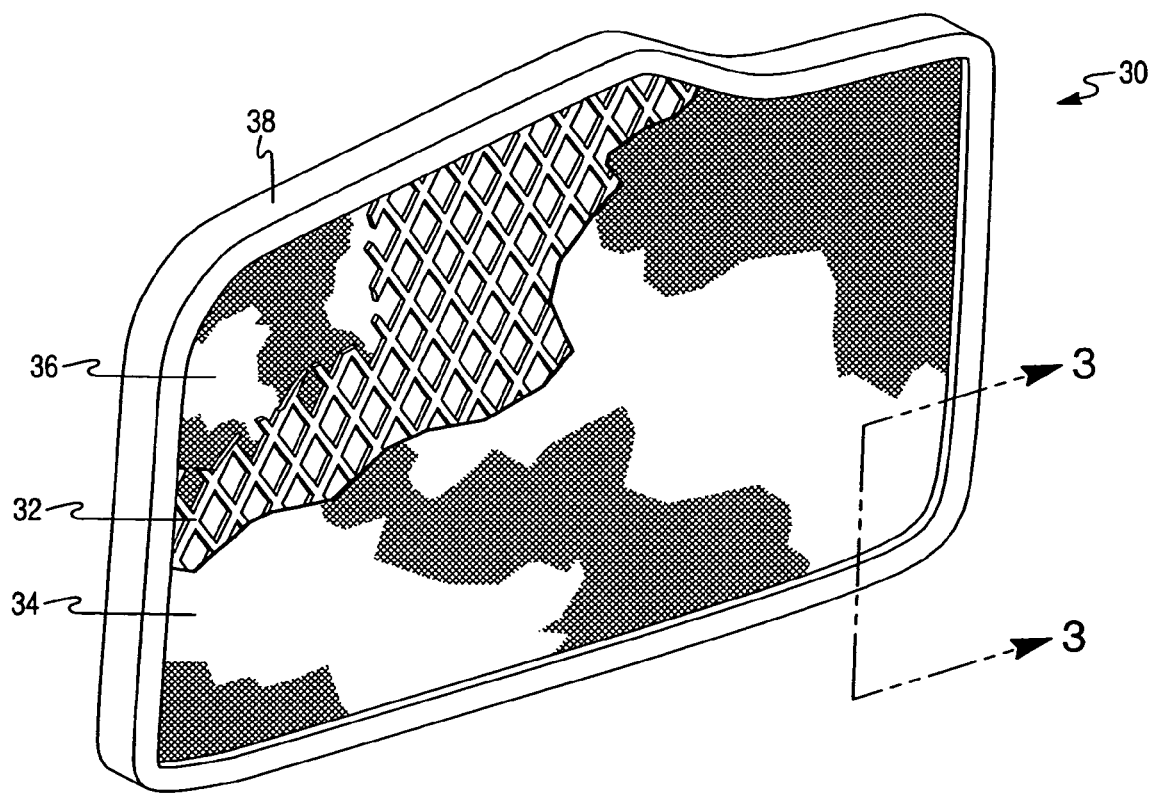
FIG. 2 is a perspective view of a hydrocarbon adsorption unit in accordance with the present invention with cut-away portions showing underlying structure.
Figure 3:
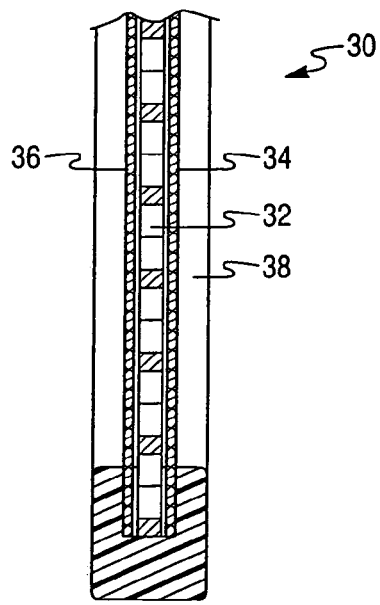
FIG. 3 is a cross-sectional view of a hydrocarbon adsorption unit in accordance with the present invention taken along line 3-3 of FIG. 2.

Referring particularly to FIG. 2, the hydrocarbon adsorbing unit 30 comprises a hydrocarbon adsorbent coated substrate 32, which contains upstream and downstream protective screens 34 and 36, respectively, or cloths. The hydrocarbon adsorbent coated screen is formed by a foraminous substrate such as described hereinabove. The hydrocarbon adsorbent coated screen 32 and the protective screens or cloths 34, 36 are held together with a frame 38. FIG. 3 shows a cross-sectional view of the hydrocarbon adsorbing unit 30 comprising a hydrocarbon coated substrate 32, which contain upstream and downstream protective screens, 34 and 36, respectively, or cloths and held together with a frame 38.

As seen from the above, the present invention provides for a hydrocarbon adsorbing unit that can be a part of one of the components in the air induction system. The present invention also helps any existing component in the air induction system to be a hydrocarbon adsorbing unit by coating the component with hydrocarbon adsorbing material. This significantly reduces the number of components in the air induction system. Although specific emphasis has been given to the hydrocarbon adsorbing material in the air induction system of a motor vehicle, it must be understood that the present invention may be used on an exhaust system of a motor vehicle.

Desorption of the volatile hydrocarbons adsorbed by the material occurs by passing a clean air stream through the unit and combusting the desorbed hydrocarbons when the engine is in an operating mode, i.e., when the vehicle is in motion and/or is in an idling mode. The adsorption of the volatile hydrocarbons in the unit of the invention will occur at relatively low temperatures, e.g., about 0 to about 350° F. (higher temperatures tend to favor desorption rather than adsorption).

The housing for the air cleaner may be comprised of a variety of metals or polymers. The selected metal or polymer should, of course, be resistant to the temperatures existing in the air induction system during various engine operating conditions, especially prolonged idling, and preferably have light weight. Of course, the housing must be resistant to oils, fuels, greases, etc. which are commonly employed for engine operation. The dimensions of the housing are not critical but are dictated by the dimensions of the conduit leading from the air cleaner to the air intake manifold of the engine, since the housing should tightly fit within such conduit (typical oil- and hydrocarbon-resistant gaskets may be employed at the end(s) of the housing to insure a vapor tight seal between the outside of the body and the inner wall of the conduit).

The housing will have an air inlet and an air outlet and will typically be open at both its ends. The shape of the housing is not critical, i.e., it may be in the shape of a cylinder, triangle, square, rectangle, polygon, etc. The length of the housing is not critical, but typically it will have a length of about 5 to about 12 inches, a width or diameter of about 5 to about 12 inches and a wall thickness of about 0.25 inches.

Suitable materials for construction of the housing include thermoplastic polymers, thermoset polymers and metals, especially aluminum, a Fe—Cr alloy or a Cr—Al—Fe alloy which are resistant to the temperatures and materials present within the engine compartment (e.g., liquid fuels, fuel vapors, oils, greases, etc.).

The adsorption material used for the practice of the present invention comprises a hydrocarbon adsorbent material coated on a substrate. The hydrocarbon adsorbent preferably is hydrophobic as well as organophilic (i.e., highly adsorptive for organic chemicals). Preferably, the substrate comprises a polymer or a metal such as aluminum, titanium, stainless steel, a Fe—Cr alloy or a Cr—Al—Fe alloy in the form of a sheet, mesh, foil, etc. In order to increase the surface area of the adsorbent, it is desirable that the metal substrate be present in a corrugated mode. Typically, the hydrocarbon adsorbent will be disposed on the substrate in a loading of about 0.05 to about 1 $g/in^2$, more preferably from about 0.1 to about 0.4 $g/in^2$, e.g., 0.2 $g/in^2$.

The hydrocarbon adsorbent may be silica gel, a molecular sieve, activated carbon or mixtures thereof. The material may be disposed on the substrate as a single layer or separate layers of silica gel, a molecular sieve or activated carbon. Preferably the material comprises a molecular sieve alone or in admixture with about 5 to about 50 wt. % of an activated carbon having a pore size of about 5 to about 500 angstroms.

Preferably, the molecular sieve will be a natural or synthetic zeolite such as faujasite, chabazite, clinoptilolite, mordenite, silicalite, zeolite X, zeolite Y, ultrastable zeolite Y, ZSM zeolite, offretite, or a beta zeolite.

Pre-treatment of the substrate may be needed to help prevent spalling of the hydrocarbon adsorbent coating. In one embodiment, the substrate may be pre-treated, e.g., by applying an undercoat to the substrate, thereby improving adhesion between the substrate and the hydrocarbon adsorption washcoat. For example, the substrate can be undercoated of pretreated with a metal oxide (e.g., aluminum oxide, cerium oxide, or zirconium oxide), a metallic arc sprayed layer, a metallic arc sprayed layer and metal oxide, a sol solution (e.g., silica sol, titania sol, or alumina sol) or may be acid etched.

Optionally, the screen may first be coated with a high-surface area component, said component comprising a pre-treatment metallic thermal arc sprayed layer and optionally a washcoat layer, such as aluminum oxide, cerium oxide, and zirconium oxide. The metallic thermal arc sprayed layer coating can be useful to facilitate the adhesion of the washcoat layer. The metallic thermal arc sprayed layer of the present invention can be applied with thermal spraying processes in general, including plasma spraying, single wire plasma spraying, high velocity oxy-fuel spraying, combustion wire and/or powder spraying, electric arc spraying, etc.

In one aspect of the present invention, electric arc spraying, e.g., twin wire arc spraying, of a metal (which term, as used herein and in the claims, includes mixtures of metals, including without limitation, metal alloys, pseudoalloys, and other intermetallic combinations) onto a substrate yields a structure having unexpectedly superior utility as a substrate for a washcoat layer, e.g., a refractory metal oxide. Twin wire arc spraying (encompassed herein by the term "wire arc spraying" and by the broader term "electric arc spraying") is a known process, see e.g., U.S. Pat. No. 4,027,367, which is incorporated herein by reference. Briefly described, in the twin wire arc spray process, two feedstock wires act as two consumable electrodes. These wires are insulated from each other as they are fed to the spray nozzle of a spray gun in a fashion similar to wire flame guns. The wires meet in the center of a gas stream generated in the nozzle. An electric arc is initiated between the wires, and the current flowing through the wires causes their tips to melt. A compressed atomizing gas, usually air, is directed through the nozzle and across the arc zone, shearing off the molten droplets to form a spray that is propelled onto the substrate. Only metal wire feedstock can be used in an arc spray system because the feedstock must be conductive. The high particle temperatures created by the spray gun produce minute weld zones at the impact point on a metallic substrate. As a result, such electric arc spray coatings (sometimes referred to herein as "anchor layers") have good cohesive strength and a very good adhesive bond to the substrate.

Thermal arc sprayed layers of a variety of compositions can be deposited on the substrate in accordance with the present invention by utilizing, without limitation, feedstocks of the following metals and metal mixtures: Ni, Al, Ni/Al, Ni/Cr, Ni/Cr/Al/Y, Co/Cr, Co/Cr/Al/Y, Co/Ni/Cr/Al/Y, Fe/Al, Fe/Cr, Fe/Cr/Al, Fe/Cr/Al/Y, Fe/Ni/Al, Fe/Ni/Cr, 300 and 400 series stainless steels, and, optionally, mixtures of one or more thereof. In one embodiment, the metallic thermal arc sprayed layer may comprise nickel and aluminum. The aluminum may comprise from about 3 to 10 percent, optionally from about 6 to 8 percent, of the combined weight of nickel and aluminum in the metallic thermal arc sprayed layer.

In another embodiment, the substrate, or the thermal arch spray coated substrate, can be coated with a slurry of a high surface area refractory metal oxide, dried for about 0.5 to about 2 hours at about 90 to about 120° C. and thereafter calcined at about 450 to about 650° C. for 0.5 to about 2 hours. High surface area refractory metal oxides are well known in the prior art. Typically, the refractory metal oxide will have a specific surface area of about 60 to about 300 $m^2/g$. Useful refractory metal oxides include alumina, titania, zirconia and mixtures of alumina with one or more of titania, zirconia, ceria, baria and a silicate. Preferably, the refractory metal oxide comprises gamma-alumina.

Thereafter, the refractory metal oxide-coated substrate is coated with a slurry of the desired adsorbent and dried (e.g., at about 105° C.). Alternatively, the refractory metal oxide-coated substrate may be coated with separate slurries of the silica gel, molecular sieve and/or activated carbon to create layers, with drying between each layer occurring as described above.

If desired, a further top coat layer of the high surface area refractory metal oxide may be applied on top of the adsorbent, thereafter drying as described above after the application of each layer.

It should also be noted that each layer need not extend to the entire layer of the substrate. For example, the entire length of the substrate may be coated with gamma alumina, dried and calcined. The entire length of the alumina-coated substrate is then coated with the selected zeolite plus binder and dried. Thereafter, only a portion of the zeolite plus binder layer may be coated with a layer of activated carbon followed by drying. Alternatively, a front section of the alumina-coated substrate is coated with the selected zeolite plus binder and a rear section is concurrently coated with activated carbon plus binder, followed by drying. As a further alternate, the alumina-coated substrate containing a middle layer of the selected zeolite may then be coated with a mixture of gamma-alumina and activated carbon (20-80 wt % alumina and the balance being activated carbon), followed by drying.

A preferred adsorbent material is a zeolite having a high silica to alumina ratio. The particularly preferred adsorbent comprises a beta zeolite of the type disclosed in U.S. Pat. No. 6,171,556 incorporated herein by reference in its entirety.

Generally, sieve materials having so-called three-dimensional pore configurations are preferred over sieve materials having one- or two-dimensional pore configurations, although some of the latter function acceptably well. Acceptable materials typically have a micropore diameter of from about 3 to 8 angstroms. Unexpectedly, zeolites (especially beta zeolites) having silica/alumina ratio ranges of about 25/1 to 300/1, and preferably from about 100/1 to about 250/1, have been shown to be particularly effective adsorbents. The preferred beta zeolites are ion-exchanged beta zeolites, such as H/beta zeolite and Fe/beta zeolite.

Preferred zeolites include ZSM-5, Y and beta zeolites, with beta zeolites particularly preferred. The preferred zeolites can be treated to reduce the number of acid sites. This can be accomplished by leaching the zeolite with an organic or inorganic acid. Preferred acids include strong inorganic acids, such as sulfuric acid, nitric acid, hydrochloric acid, phosphoric acid and the like, and carboxylic acids such as trifluoroacetic acid, and dicarboxylic acids such as oxalic, malonic, succinic, glutaric, adipic, maleic, fumaric, phthalic and the like. Useful acids preferably include polyacids, preferably difunctional acids, more preferably dicarboxylic acids with oxalic acid most preferred. The acid use is at a concentration of 0.02 to 12N, preferably 0.1 to 10N, and a solid zeolite concentration of 0.01 to 1.0 g/ml and preferably 0.05 to 0.5 g/ml. The leaching is conducted at a suitable temperature range, typically of from 10 to 100° C.; for example, preferably at 70 to 100° C. when using sulfuric acid and from 10 to 50° C. when using oxalic acid. The leaching is conducted for a sufficient time to achieve the desired silica to alumina ratio attainable at the leach conditions and concentrations, and is typically from about 0.5 to 5 hours, and preferably 0.5 to 3 hours.

The zeolite may be used as is or it may be treated with steam at about 350 to about 900° C. Preferably, the stream treatment is conducted at 400 to 800° C., and more preferably 500 to 750° C. with a most preferred range being from 550 to 750° C. The steam temperature can be increased at a suitable rate such as from 100 to 600° C. per hour. Typical steam concentration is from 10 to 100% and preferably 30 to 100% with a preferred concentration of from about 50 to 100% with the balance being air. The steaming is preferably conducted at atmospheric pressure. The duration of the steam treatment is sufficient to treat the zeolite and is typically from 0.5 to 48 hours, preferably 0.5 to 24 hours, more preferably from 0.5 to 8 hours and most preferably 0.5 to 5 hours. The steam treatment does not significantly increase the silica to alumina ratio. However, it is believed to reduce the acidity of the zeolite by removing at least some of the aluminum from the framework of the zeolite. Steam treated zeolites have been found to increase the durability of zeolites when used to adsorb hydrocarbons in gaseous streams and to resist coke formation. Preferably, the zeolite is treated with both acid (e.g., sulfuric acid) leaching and steam treatment.

In a particularly preferred process, the zeolite is first acid leached followed by steam treatment. Optionally, the steps of steam treatment and acid leaching may be repeated in any desired order. For example, leached and steamed zeolite may be repeatedly leached followed by steaming. In a specific embodiment, the zeolite may be leached, steamed and leached again.

A useful method to treat beta zeolite is disclosed in CN 1059701A, published Mar. 25, 1992 and incorporated herein by reference. This reference discloses a high Si beta zeolite produced by calcining to remove nitrogen compounds from a beta zeolite made through an organo-amine template process. Leaching the beta zeolite is accomplished with an organic or inorganic acid solution having a concentration of 0.02 to 12N, preferably 0.1 to 10N, and a solid zeolite concentration of 0.01 to 1.0 g/ml and preferably 0.05 to 0.5 g/ml at from 10 to 100° C. for 0.5 to 5 hours, and preferably 1 to 3 hours. The leaching is followed by treating the zeolite with steam at from 400 to 900° C. with the steam temperature increasing at from 100 to 600° C. per hour. Disclosed steam concentration is 100% at a system pressure of 50 to 500 KPa. The duration of the steam treatment is from 0.5 to 5 hours.

In accordance with a preferred embodiment of the present invention, zeolites can be used which are treated to increase the silica to alumina ratio supplemented by steam treatment. Methods to increase the silica to alumina ratio result in removal of the alumina from the zeolite. Leaching for example removes aluminum from the framework of the zeolite structure. The removed aluminum in the form of aluminum ion salt is removed with the leaching liquor.

Of particular interest with regard to the present invention is the acidity which is imparted by the alumina in the zeolite framework. It is believed that the high silica to alumina ratio attained by leaching is related to the acidity of the zeolite. The acidity of the zeolite is believed to affect the durability of the zeolite when used to adsorb hydrocarbons from exhaust streams such as automotive and industrial exhaust steams which are typically at temperatures in the range of from 300 to 800° C. and more typically from 350 to 600° C. The zeolite, when used in such environments tends to lose adsorption efficiency due primarily to clogging of the pores and/or collapse of the zeolite framework. Maintenance of the stable zeolite framework can be attained by controlling the conditions under which the zeolite is treated. Such conditions include acid concentrations, steam temperatures and the like. Milder conditions reduce the tendency for the zeolite framework to deteriorate during treatment and permit the framework to be stabilized at the location where the alumina was removed.

Additionally, it is believed that steam treatment removes aluminum from the zeolite framework. The affected aluminum continues to reside in the zeolite, probably in the pores. The zeolite framework is believed to stabilize without the aluminum and the aluminum ions in the pores becomes alumina. The remaining alumina in the pores is believed not contribute to the acidity of the zeolite which is reduced. The alumina in the pores can remain or be washed or leached out in a subsequent leaching step.

The zeolite, non-steamed or steamed, has been found to have improved coking resistance, i.e., the formation of coke during engine testing has been significantly reduced. While acid leaching methods to increase the silica to alumina ratio of a zeolite are known to decrease acidity, such methods are believed to remove aluminum atoms from zeolite particles indiscriminately. Methods such as steaming remove the aluminum from the framework of the zeolite preferentially at the Bronsted acid sites. The importance of this can be recognized by both more effective resistance to coking and by the knowledge of how to treat a zeolite to attain such performance with minimizing deterioration of the framework. In essence, leaching a zeolite to death will result in reduced Bronsted acidity; but using a method such as steam treatment alone, or more preferably balanced with leaching results in a more durable zeolite for use as a hydrocarbon adsorber in accordance with the present invention.

The hydrocarbon adsorbent material may also include a binder that will cause the material to adhere to the surface of the substrate. Such a binder is also referred to as a washcoat binder. Washcoat binders typical for use in the formulation of slurries include, but are not restricted to, the following: organic polymers; sols of alumina, silica or zirconia; inorganic salts, organic salts and/or hydrolysis products of aluminum, silica or zirconium; hydroxides of aluminum, silica or zirconium; organic silicates that are hydrolyzable to silica; and mixtures thereof.

The preferred binder is an organic polymer used in amounts of from 0.5 to 20, preferably 2 to 10, percent by weight of binder based on the weight of the material. The organic polymer may be a thermosetting or thermoplastic polymer and may be plastic or elastomeric. The polymeric binder may contain suitable stabilizers and age resistors known in the polymeric art. Most preferred are thermosetting, elastomeric polymers introduced as a latex into the adsorbent composition, preferably as an aqueous slurry. Upon application of the composition and drying, the binder material fixes the hydrocarbon adsorbent particles to themselves and the substrate surface, and in some cases, can crosslink with itself to provide improved adhesion. This enhances the integrity of the coating, its adhesion to the substrate and provides structural stability under vibrations encountered in motor vehicles. The use of a binder enables the material to adhere to the substrate without the necessity of an undercoat layer. The binder may also comprise additives to improve water resistance and improve adhesion.

Useful organic polymer binder compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly(vinyl halides), polyamides, cellulosic polymers, polyimides, acrylics, vinyl acrylics and styrene acrylics, polyvinyl alcohol, thermoplastic polyesters, thermosetting polyesters, poly(phenylene oxide), poly(phenylene sulfide), fluorinated polymers such as poly(tetrafluoroethylene) polyvinylidene fluoride, poly(vinylfluoride) and chloro/fluoro copolymers such as ethylene chlorotrifluoro-ethylene copolymer, polyamide, phenolic resins and epoxy resins, polyurethane, acrylic/styrene acrylic copolymer latex and silicone polymers. A particularly preferred polymeric binder is an acrylic/styrene acrylic copolymer latex.

It has been found that compatibility of the components of a slurry comprising an adsorbent material and a polymeric binder, such as a latex emulsion, is important for maintaining slurry stability and uniformity. For the purpose of the present invention compatibility means that the binder and the adsorbent material remain as a mixture of separate particles in the slurry. It is believed that when the polymeric binder is a latex emulsion and the emulsion and hydrocarbon adsorbent material have electrical charges which cause the emulsion and hydrocarbon adsorbent material to repel each other, the emulsion and hydrocarbon adsorbent material are compatible and the slurry is stable and has a uniform distribution of the hydrocarbon adsorbent material and the polymer latex in the liquid vehicle, e.g. aqueous fluid such as water. If the adsorbent material and latex emulsion particles do not mutually repel each other, irreversible agglomeration of the latex on the adsorbent material will occur. These materials are therefore incompatible and the latex comes out of the emulsion.

For those zeolites that generate a low pH mixture when dispersed in water, additional stabilization can be achieved by increasing the pH. This is important since organic latex binder emulsions commonly used in the art are anionically charged and therefore, typically have a pH greater than 7. Combining a high pH binder emulsion with a low pH zeolite slurry creates instability that often results in slurry coagulation. The pH of the slurry can be controlled depending on the acidity of the adsorbent material, with pH levels being from about 4 to about 10. A preferred range is from about 5 to about 8, more preferably from about 6 to about 7.5.

In another embodiment, it is preferred to use a dispersant in conjunction with the binder. The dispersant may be anionic, non-ionic or cationic and is typically utilized in an amount of about 0.1 to about 10 weight percent, based on the weight of the material. Not surprisingly, the specific choice of dispersant is important. Suitable dispersants may include polyacrylates, alkoxylates, carboxylates, phosphate esters, sulfonates, taurates, sulfosuccinates, stearates, laureates, amines, amides, imidazolines, sodium dodecylbenzene sulfonate, sodium dioctyl sulfosuccinate and mixtures thereof. In one embodiment, a preferred dispersant is a low molecular weight polyacrylic acid in which many of the protons on the acid are replaced with sodium. In a particularly preferred embodiment, low molecular weight anionic dispersants such as sodium dodecylbenzene sulfonate and sodium dioctyl sulfosuccinate have been found to provide excellent zeolite dispersion and zeolite-binder stability. For example, in the case of slurry formulated with high Si/Al ratio SAL-beta zeolite (i.e., sulfuric acid leached beta zeolite) and styrene-acrylic latex binder emulsion, low molecular weight anionic dispersants have been found to provide excellent zeolite dispersion and zeolite-binder stability. A preferred composite comprising about 90 weight percent beta zeolite, about 9 weight percent acrylic polymer latex and about 1 weight percent sodium dodecylbenzene sulfonate or sodium dioctyl sulfosuccinate.

While increasing the slurry pH or adding anionic dispersant alone may provide enough stabilization for the slurry mixture, best results may be obtained when both an increased pH and anionic dispersant are used. For example, for zeolite-based slurries that generate a low pH when dispersed in water and/or a dispersant, additional stabilization can be achieved by increasing the pH, as described above.

The hydrocarbon adsorbent slurries of the present invention, particularly slurries containing polymer latexes, can contain conventional additives such as thickeners, biocides, antioxidants and the like. In one embodiment, a thickener such as a xanthan gum thickener or a carboxymethylcellulose thickener can be used. The thickener makes it possible to achieve a sufficient amount of coating (and hence sufficient hydrocarbon adsorption capacity) on relatively low surface area substrates. The thickener may also serve in a secondary role by increasing slurry stability by steric hinderence of the dispersed particles. It may also aid in the binding of the coating surface.

The preferred method for applying the coating is to use a spray process. Zeolite slurry (zeolite, water, binder, thickener—with appropriate viscosity) can be sprayed onto the screen by any conventional means, for example, by using a paint gun. Excess slurry can be blown off with dry air or nitrogen to dry the coating and clear the screen openings. This process can be repeated in order to build up the desired amount of adsorbent. The coated screen can then be fully dried in a mechanical convection oven at 25° to 200° C., preferably 90° C. Other methods for applying the coating may include a dip process or a process in which the screen is pulled from a roll and passes through a bath of slurry in a continuous conveyer style system.

The following nonlimiting examples illustrate the invention. Unless otherwise indicated, all parts and percentages are on a weight basis.

EXAMPLES

Example 1

Sulfuric acid-leached ("SAL") beta zeolite was prepared in accordance with the procedure set forth in Example 5 of U.S. Pat. No. 6,171,556. The SAL beta zeolite was then steamed in an atmosphere of air with 60% of steam at 650° C. for 24 hours to give a final product having a $SiO_2/Al_2O_3$ ratio of about 200.

500 g of the steamed-SAL final product were dispersed in 521 g of deionized water to form a slurry having a 48% solid content. The slurry was then ball milled such that 90% of the particles had a particle size of less than 9.5 microns. A final slurry was achieved by adding the slurry with 21 g of a colloidal polyacrylic dispersant and 154 g of a polyacrylic latex binder having a solids content of about 50 wt %, a pH of about 6 and a maximum viscosity of 400 cps.

Example 2

A wire screen mesh comprising a Cr—Al—Fe alloy containing a wire diameter of 0.028 inches and 12 by 12 wires per linear inch is coated with the final slurry obtained from Example 1. The coated screen is dried and placed in a programmable oven and the temperature was slowly raised to 105° C. and maintained at such temperature for 1 hour. The washcoat dry gain is 6.4 g. The screen is again coated by the same procedure resulting in a coating having a final dry gain of 12.1 g.

Example 3

A slurry of sulfuric acid leached beta zeolite was prepared as in Example 1, with polyacrylic latex binder, organic thickener, solids content of about 50%, and pH of about 6. The slurry was spray coated onto an aluminum wire screen having a mesh size of 12×12 wires per inch with 0.023" diameter wires. Approximately 22 g of coating were applied to a screen of 12"×8¼" face area. Prior to coating the aluminum screen, it was pre-coated with silica sol solution and dried at 70° C. The coated screen was assembled in a frame of nylon between two layers of nylon mesh having an opening of 300 micron.

The assembly was installed into the air cleaner of a vehicle between the air filter and the engine. Standard hot-soak followed by 48 hour diurnal SHED (Sealed Housing for Evaporative Determination) tests were conducted of this air intake containing the zeolite coated screen assembly and compared to SHED tests conducted with the stock air intake system having no hydrocarbon adsorber. The emissions from the air intake were collected and analyzed for hydrocarbon content at the end of the test. The results are shown in Table 1.

TABLE 1

| Sum of hydrocarbons from vehicle air intake system in mg's. | | | | |
|---|---|---|---|---|
| | Vehicle 1 | | Vehicle 2 | |
| | Hot Soak | 48 Hour Diurnal | Hot Soak | 48 Hour Diurnal |
| Stock air intake system - no hydrocarbon adsorber | <0.01 | 32.45 | 0.37 | 9.54 |
| Air intake system with hydrocarbon adsorbing screen assembly | 0.01 | 5.60 | 0.03 | 1.89 |

What is claimed is:

1. A hydrocarbon adsorption unit for use in the air induction system of an automobile comprising, a hydrocarbon adsorbent-coated foraminous substrate and at least one protective screen adjacent to said substrate, wherein said substrate is undercoated or pre-treated with a metal oxide undercoat, a metallic thermal arc sprayed layer undercoat, a metallic thermal arc sprayed layer and metal oxide undercoat, a sol solution undercoat, or acid etching pre-treatment, and wherein said undercoated or pre-treated foraminous substrate is coated with said hydrocarbon adsorbent.

2. The hydrocarbon adsorption unit of claim 1, wherein said hydrocarbon adsorbent is selected from the group consisting of silica gel, activated carbon, faujasite, chabazite, clinoptilolite, mordenite, silicalite, zeolite X, zeolite Y, ultrastable zeolite Y, ZSM zeolite, offretite, and a beta zeolite.

3. The hydrocarbon adsorption unit of claim 1, wherein said hydrocarbon adsorbent is beta zeolite.

4. The hydrocarbon adsorption unit of claim 1, wherein said foraminous substrate is a wire screen mesh.

5. The hydrocarbon adsorption unit of claim 4, wherein said wire screen mesh has a wire diameter from about 0.01 inches to about 0.07 inches, and wherein said wire screen mesh contains from about 8 by 8 to about 20 by 20 wires per linear inch.

6. The hydrocarbon adsorption unit of claim 4, wherein said wire screen mesh is selected from the group consisting of stainless steel, Fe—Cr—Al alloy, titanium, aluminum, nylon, polypropylene, PVC, ABS, and polyethylene.

7. The hydrocarbon adsorption unit of claim 1, wherein said metallic thermal arc sprayed layer undercoat is selected from the group consisting of Ni, Al, Ni/Al, Ni/Cr, Ni/Cr/Al/Y, Co/Cr, Co/Cr/Al/Y, Co/Ni/Cr/Al/Y, Fe/Al, Fe/Cr,Fe/Cr/Al, Fe/Cr/Al/Y, Fe/Ni/Al, Fe/Ni/Cr, 300 and 400 series stainless steels.

8. The hydrocarbon adsorption unit of claim 4, wherein said wire screen mesh is undercoated with said metallic thermal arc sprayed layer and a refractory oxide layer.

9. The hydrocarbon adsorption unit of claim 1, wherein said unit contains two protective screens and wherein said screens are on opposite sides of said substrate.

10. A hydrocarbon adsorption unit for use in an air induction system of an automobile comprising a hydrocarbon adsorbent-coated foraminous substrate wherein said substrate is undercoated or pre-treated with a metal oxide undercoat, a metallic thermal arc sprayed layer undercoat, a metallic thermal arc sprayed layer and metal oxide undercoat, a sol solution undercoat or acid etching pre-treatment and wherein said undercoated or pre-treated substrate is coated with said hydrocarbon adsorbent coat.

11. The hydrocarbon adsorption unit of claim 10, wherein said hydrocarbon adsorbent is selected from the group consisting of silica gel, activated carbon, faujasite, chabazite, clinoptilolite, mordenite, silicalite, zeolite X, zeolite Y, ultrastable zeolite Y, ZSM zeolite, offretite, and a beta zeolite.

12. The hydrocarbon adsorption unit of claim 10, wherein said substrate is a wire screen mesh.

13. The hydrocarbon adsorption unit of claim 12, wherein said wire screen mesh has a wire diameter from about 0.01 inches to about 0.07 inches, and wherein said wire screen mesh contains from about 8 by 8 to about 20 by 20 wires per linear inch.

14. The hydrocarbon adsorption unit of claim 12, wherein said wire screen mesh is selected from the group consisting of stainless steel, Fe—Cr—Al alloy, titanium, aluminum, nylon, polypropylene, PVC, ABS, and polyethylene.

15. In an air induction system of an automobile comprising an air filter, an air inlet upstream of said air filter and an air outlet downstream of said air filter, said air outlet directing air to an engine, and a hydrocarbon adsorbent placed between said air filter and said air outlet, the improvement comprising, a foraminous substrate, wherein said substrate is undercoated or pre-treated with a metal oxide undercoat, a metallic thermal arc sprayed layer undercoat, a metallic thermal arc sprayed layer and metal oxide undercoat, a sol solution undercoat, or acid etching pre-treatment and wherein said hydrocarbon adsorbent is coated on said undercoated or pre-treated foraminous substrate, and at least one protective screen being adjacent to said foraminous substrate.

16. The air induction system of claim 15, wherein said hydrocarbon adsorbent is selected from the group consisting of silica gel, activated carbon, faujasite, chabazite, clinoptilolite, mordenite, silicalite, zeolite X, zeolite Y, ultrastable zeolite Y, ZSM zeolite, offretite, and a beta zeolite.

17. The air induction system of claim 15, wherein said foraminous substrate is a wire screen mesh.

18. The hydrocarbon adsorption unit of claim 15, wherein said hydrocarbon adsorbent coated foraminous substrate has one protective screen adjacent to said foraminous substrate on the downstream side of said foraminous substrate.

19. The hydrocarbon adsorption unit of claim 15, wherein said hydrocarbon adsorbent coated foraminous substrate has one protective screen adjacent to said foraminous substrate on the upstream side of said foraminous substrate and one protective screen adjacent to said foraminous substrate on the downstream side of said foraminous substrate.

* * * * *